United States Patent
Katz et al.

[11] Patent Number: 5,900,954
[45] Date of Patent: * May 4, 1999

[54] MACHINE READABLE RECORD CARRIER WITH HOLOGRAM

[75] Inventors: Joseph Katz, Stony Brook; Jerome Swartz, Old Field; Daniel R. McGlynn, Brooklyn, all of N.Y.

[73] Assignee: Symbol Technologies, Inc., Holtsville, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/484,708

[22] Filed: Jun. 7, 1995

Related U.S. Application Data

[63] Continuation-in-part of application No. 08/250,348, May 27, 1994, Pat. No. 5,489,158, and application No. 08/212,513, Mar. 11, 1994, abandoned, which is a continuation-in-part of application No. 07/897,772, Jun. 12, 1992, Pat. No. 5,422,744, said application No. 08/250,348, is a continuation of application No. 07/903,222, Jun. 25, 1992, abandoned, and application No. 08/246,786, May 20, 1994, Pat. No. 5,471,533, which is a continuation of application No. 07/891,742, Jun. 1, 1992, Pat. No. 5,337,361.

[51] Int. Cl.⁶ ............................ G03H 1/00; B42D 15/00; H04K 1/00
[52] U.S. Cl. .................................. 359/2; 359/1; 283/86; 380/23
[58] Field of Search ............................ 359/1, 2; 235/380, 235/457; 283/86; 380/23

[56] References Cited

U.S. PATENT DOCUMENTS

| | | |
|---|---|---|
| 1,561,149 | 11/1925 | Gage . |
| 2,679,474 | 5/1954 | Pajes ........................................ 204/27 |
| 3,309,162 | 3/1967 | Kosanke et al. ........................ 350/160 |
| 3,536,371 | 10/1970 | Post ......................................... 350/3.5 |

(List continued on next page.)

FOREIGN PATENT DOCUMENTS

| | | |
|---|---|---|
| 58-106519 | 6/1983 | Japan . |
| 60-83074 | 5/1985 | Japan . |
| 62-283384 | 12/1987 | Japan . |
| 3-192318 | 8/1991 | Japan . |
| 3-208011 | 9/1991 | Japan . |
| 3-257418 | 11/1991 | Japan . |
| 4-264582 | 9/1992 | Japan . |
| 1416310 | 12/1975 | United Kingdom . |

OTHER PUBLICATIONS

Caulfield, *Handbook of Optical Holography*, Academic Press, New York (1979), Chapter 10.1 "Digital Data Storage," pp. 379–413.

Collier, et al., *Optical Holography*, Academic Press, New York (1971), Chapter 16 "Information Storage", pp. 454–493.

Kohler, et al., "Storage of 2000 holograms in a photochemical hole–burning system", *Optics Letters*, vol. 18, No. 24 (Dec. 15, 1993), pp. 2144–2146.

Swartz, "Bar Codes and Other Technology Leaps", New York Times, Jun. 6, 1993, Long Island Section 10.2.

Wild, et al., "Hole burning, Stark effect, and data storage", *Applied Optics*, vol. 24, No. 10 (May 15, 1985) pp. 1526–1529.

Zech, "Mass Storage Future Perfect?", *Optics & Photonics News*, (Aug. 1992), pp. 16–25.

Bell (Senior Editor), "Innovations", IEEE Spectrum (Apr. 1995), p. 17.

*Primary Examiner*—Cassandra C. Spyrou
*Assistant Examiner*—Audrey Chang
*Attorney, Agent, or Firm*—Fish & Richardson P.C.

[57] ABSTRACT

A record carrier (e.g., an identification card) of the type containing machine-readable representations of data, wherein the record carrier comprises a substrate, a first pattern of machine-readable indicia applied to one surface of the substrate, and a hologram containing machine-readable data disposed on one surface of the substrate. The information represented by the machine-readable indicia and the machine-readable data are related to one another so as to enable a user to verify the authenticity of the record carrier by comparison of the indicia and the data.

22 Claims, 4 Drawing Sheets

U.S. PATENT DOCUMENTS

| | | | |
|---|---|---|---|
| 3,547,546 | 12/1970 | Schier | 350/162 |
| 3,619,033 | 11/1971 | McMahon | 350/162 |
| 3,704,949 | 12/1972 | Thomas et al. | 356/71 |
| 3,894,756 | 7/1975 | Ward | 283/7 |
| 3,957,353 | 5/1976 | Fienup et al. | 350/162 SF |
| 4,041,279 | 8/1977 | Foote | 235/61.7 B |
| 4,103,991 | 8/1978 | Kramer | 350/297 |
| 4,106,844 | 8/1978 | Bryngdahl et al. | 350/6.2 |
| 4,108,367 | 8/1978 | Hannan | 235/457 |
| 4,150,781 | 4/1979 | Silverman et al. | 235/382 |
| 4,165,464 | 8/1979 | Ikeda et al. | 250/550 |
| 4,269,473 | 5/1981 | Flothmann et al. | 350/3.61 |
| 4,289,372 | 9/1981 | Clay | 350/3.83 |
| 4,304,459 | 12/1981 | Kramer | 350/3.71 |
| 4,333,006 | 6/1982 | Gorin et al. | 235/457 |
| 4,353,615 | 10/1982 | Kramer et al. | 350/3.71 |
| 4,415,224 | 11/1983 | Dickson | 350/3.71 |
| 4,563,024 | 1/1986 | Blyth | 283/91 |
| 4,568,141 | 2/1986 | Antes | 350/3.61 |
| 4,583,816 | 4/1986 | Kramer | 350/3.71 |
| 4,610,500 | 9/1986 | Kramer | 350/3.71 |
| 4,626,062 | 12/1986 | Ishikawa | 350/3.71 |
| 4,639,071 | 1/1987 | Matsumoto et al. | 350/3.71 |
| 4,641,017 | 2/1987 | Lopata | 235/457 |
| 4,684,795 | 8/1987 | Colgate, Jr. | 235/457 |
| 4,712,852 | 12/1987 | Funato et al. | 350/371 |
| 4,779,944 | 10/1988 | Ritter et al. | 350/3.71 |
| 4,786,126 | 11/1988 | Kramer | 350/3.71 |
| 4,802,758 | 2/1989 | Fabbiani | 356/71 |
| 4,810,046 | 3/1989 | Yamagishi et al. | 350/371 |
| 4,820,006 | 4/1989 | Constant | 350/3.85 |
| 4,826,268 | 5/1989 | Kramer | 350/371 |
| 4,830,443 | 5/1989 | Hecker et al. | 350/3.71 |
| 4,852,956 | 8/1989 | Kramer | 350/3.71 |
| 4,873,426 | 10/1989 | Sarna et al. | 235/462 |
| 4,889,366 | 12/1989 | Fabbiani | 283/86 |
| 4,945,215 | 7/1990 | Fukushima et al. | 235/457 |
| 4,963,756 | 10/1990 | Quan et al. | 250/568 |
| 4,969,700 | 11/1990 | Haines | 350/3.66 |
| 4,972,476 | 11/1990 | Nathans | 380/23 |
| 4,973,112 | 11/1990 | Kramer | 350/3.71 |
| 4,988,154 | 1/1991 | Hansen | 350/3.86 |
| 5,028,102 | 7/1991 | Ogura et al. | 350/3.62 |
| 5,046,794 | 9/1991 | Ritter et al. | 359/18 |
| 5,059,776 | 10/1991 | Antes | 235/457 |
| 5,095,194 | 3/1992 | Barbanell | 235/379 |
| 5,111,314 | 5/1992 | Leib | 359/29 |
| 5,138,468 | 8/1992 | Barbanell | 359/2 |
| 5,142,384 | 8/1992 | Wood et al. | 359/3 |
| 5,145,212 | 9/1992 | Mallik | 283/86 |
| 5,159,635 | 10/1992 | Wang | 380/51 |
| 5,182,659 | 1/1993 | Clay et al. | 359/17 |
| 5,285,438 | 2/1994 | Marchand et al. | 369/103 |
| 5,289,299 | 2/1994 | Paek et al. | 359/29 |
| 5,289,407 | 2/1994 | Strickler et al. | 365/106 |
| 5,291,320 | 3/1994 | Paek | 359/28 |
| 5,306,899 | 4/1994 | Marom et al. | 235/382 |
| 5,336,871 | 8/1994 | Colgate, Jr. | 235/380 |
| 5,422,744 | 6/1995 | Katz et al. | 359/2 |

MACHINE READABLE RECORD CARRIER WITH HOLOGRAM

CROSS REFERENCE TO RELATED APPLICATIONS

This application is a continuation-in-part of application Ser. No. 08/212,513, filed Mar. 11, 1994, now abandoned, which is a continuation-in-part of application Ser. No. 07/897,772, filed Jun. 12, 1992, now U.S. Pat. No. 5,422,744, which is related to U.S. Pat. No. 5,306,899, issued Apr. 26, 1994. This application is also a continuation-in-part of application Ser. No. 08/250,348, now U.S. Pat. No. 5,489,158, filed May 27, 1994, which is a continuation of application Ser. No. 07/903,222, filed Jun. 25, 1992, now abandoned, and of application Ser. No. 08/246,786, filed May 20, 1994, now U.S. Pat. No. 5,471,533, which is a continuation of Ser. No. 07/891,742, filed Jun. 1, 1992, now U.S. Pat. No. 5,337,361.

BACKGROUND OF THE INVENTION

The present invention relates generally to record carriers which contain both human-readable data and machine-readable representations of data and images, and more particularly to a method and apparatus for fabricating confidential or intrinsically valuable record carriers, such as credit cards, driver's licenses, access or personal identification cards, passports, visas, tickets or bearer financial instruments. In such carriers known in the prior art, sophisticated printing or fabrication techniques are used, so that a counterfeiter would find it difficult to reproduce the card. For example, the card may include a photograph of the bearer, or a hologram.

Currently, many record carriers include both graphic images, such as a design or photograph, and data, such as textual or numerical information. Passports, visas, driver's licenses and credit cards include photographs of their owners and data about the use of the records. A passport has information about the personal background. A visa has information regarding the purpose of the visit of the holder. A driver's license has information regarding the owner's driving restrictions. A credit card has information on the owner's account number.

In order to discourage the fraudulent manufacture of instruments or cards having financial value, such as credit cards, card manufacturers produce a card that includes a holographic display. A hologram is a recording of an interference pattern between two beams of light, usually referred to as the signal beam and the reference beam. The signal beam usually includes the visually recognizable image to be recorded (such as a bird, a globe, or a company logo), and the reference beam is a beam of light, usually of constant distribution, i.e., plane of spherical wavefront. Typically, another reference beam, similar to the one used to record the hologram, is used to reconstruct the signal beam, which then produces an identifiable image. For many holograms, one cannot identify an image without reconstruction.

The holograms typically used on credit cards are what are known as reflective surface, or rainbow, holograms. They are produced by placing the image to be recorded near the surface of the holographic substrate during recording. These holograms are visible in ordinary, white light and should be familiar to most holders of credit cards. The rainbow hologram can be mass produced on sheets of metalized embossing substrate, and stamped onto credit cards. Such holograms are a deterrent to counterfeiting because their production requires an expensive manufacturing investment, and the authenticity of the card is easy to determine by visually viewing the hologram in ordinary light.

Other records have images, such as pictures of the bearer, and other types of data. For example, certain financial instruments, such as postage stamps, food stamps, or currency will have a distinctive picture, such as of George Washington, as well as data about the financial instrument. Other instruments, such as stock certificates and the like, have similar types of images and data.

SUMMARY OF THE INVENTION

Currently, the data, images and holograms on such records are separate. There has been no mechanism to interrelate the data, images and holograms in a way that enhances the security or authenticity of the record. Such enhancement could be used to reduce unauthorized use or counterfeiting, which are problems both for records using a photograph for identification and for records using a distinctive hologram.

It is therefore an object of the invention to provide a record carrier with a graphic holographic image along with encoded information to validate or authenticate the record.

It is another object of the invention to provide a technique to interrelate the information in the graphic holographic image with the encoded information.

It is a further object of the invention to provide a record with graphic and human-readable information such that any modification, erasure or distortion in the human-readable information placed on the record can be easily detected.

Another object of the invention is to provide a graphic holographic image and encoded information on a record in such a way as to permit both image and information to be machine-readable and verifiable.

In a first aspect, the invention features a record carrier of the type containing machine-readable representations of data, wherein the record carrier comprises a substrate, a first pattern of machine-readable indicia applied to one surface of the substrate, and a hologram containing machine-readable data disposed on one surface of the substrate. The information represented by the machine-readable indicia and the machine-readable data are related to one another so as to enable a user to verify the authenticity of the record carrier by comparison of the indicia and the data.

In preferred embodiments, the hologram is a reflective surface hologram; the machine-readable data contained in the hologram is represented by second machine-readable indicia on the hologram; the first and second machine-readable indicia are either separate indicia or segments of the same indicia; the first and second indicia are segments of the same two-dimensional bar code symbol, a portion of which is applied to the substrate and another portion of which is applied over the reflective surface hologram; the hologram includes a graphic image, and a portion of the graphic image overlaps with the second machine-readable indicia.

In a second aspect, the invention features a record carrier of the type containing machine-readable representations of data, and having a graphic image disposed on one portion of a substrate, a machine-readable pattern of indicia disposed relative to a portion of the graphic image so as to produce a corrupted image, a second machine-readable pattern of indicia disposed on the substrate and spaced from the corrupted image and containing information corresponding to the corrupted image. The invention allows the record carrier to be authenticated by making a comparison between the corruption of the graphic image and information stored in the machine-readable indicia.

In preferred embodiments, the first machine-readable pattern of indicia at least in part overlaps with a portion of the graphic image; and the graphic image is provided by a hologram.

In a third aspect, the invention features record carriers containing personal identification data at least some of which is encrypted using an encryption algorithm based upon an encryption key. The encrypted data is represented by a two-dimensional bar code structure containing a plurality of ordered, adjacent rows of codewords of bar coded information, each of the codewords representing at least one information-bearing character. the image of the two-dimensional bar code structure is transferred onto a carrier so that it overlaps at least in part with a hologram disposed on the carrier.

The invention provides a record carrier, e.g., a source identification card, that is highly resistant to forgery or counterfeiting; tamper resistant; and provides in machine-readable form an encoded listing of physical traits (signature, photograph, height, weight, etc.) that is accessible by a reader at a remote site and that enables the user to determine that the bearer of the card is the actual person for whom the card was generated.

Other features and advantages of the invention will be apparent from the following description of a preferred embodiment, and from the claims.

DESCRIPTION OF THE PREFERRED EMBODIMENTS

The embodiments of FIGS. 1–7 were included in the disclosure of U.S. application Ser. No. 07/897,772 filed Jun. 12, 1992. The embodiments relate to record carriers (e.g., credit cards) having both a hologram and a machine-readable indicia such as a bar code symbol.

Figure 1:
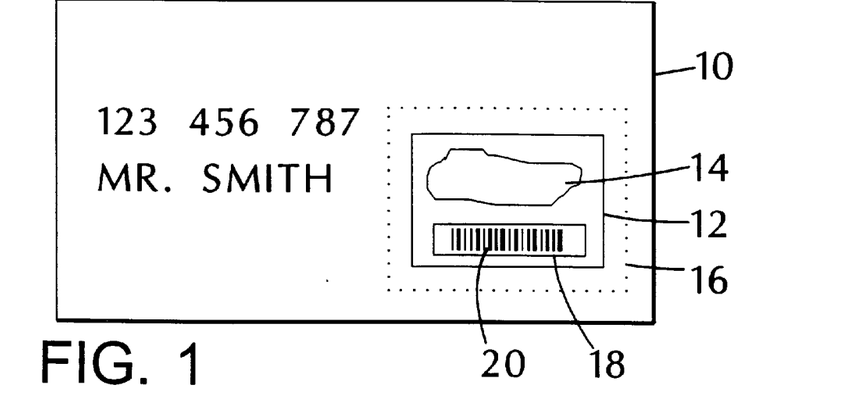
FIGS. 1–3 are pictorial representations of record carriers having holographic displays with incorporated bar codes.

Referring to FIG. 1, holographic display element 12 is positioned on a substrate base, for example, a credit card 10. Display element 12 is a rainbow hologram with an image 14 embossed as an interference pattern in a polymeric film. The image, which may be of most any form, has a three-dimensional appearance. Display element 12 has a window 18 which is cut out of the display, and a symbol with regions of different light reflective properties, such as bar code symbol 20, is printed in this window. The combination of display element 12 and bar code symbol 20 is covered by transparent lamination cover 16.

Figure 2:
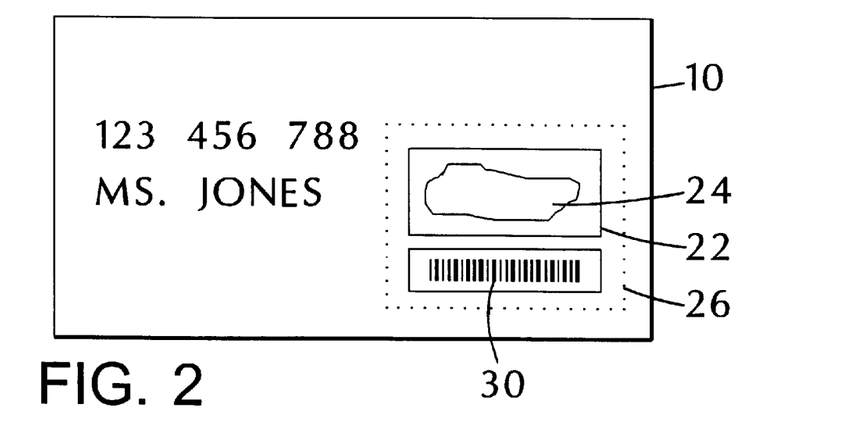

In the embodiment in FIG. 2, credit card 10 includes display element 22 with image 24. Bar code symbol 30 is positioned next to display element 22. The image and bar code are covered together with transparent lamination cover 26. With this arrangement of bar code symbol and display element, there is no need to cut the polymeric film forming the holographic display element.

Figure 3:
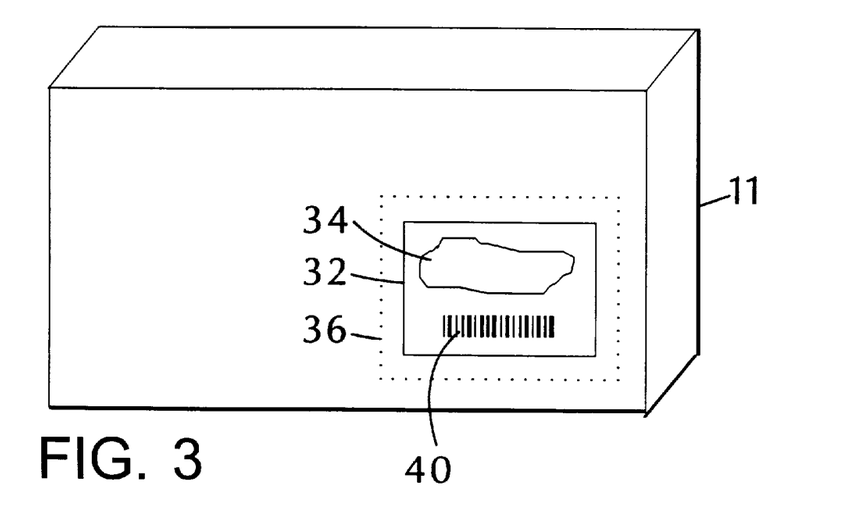

FIG. 3 shows a display element 32 with image 34 and a bar code 40 which has been printed directly on top of the polymeric film of the holographic display, and positioned on a box 11. The bar code could be printed on a specially prepared area reserved for a bar code, or even directly on top of the holographic region of the polymeric film. The bar code 40 could also be etched or embossed in the polymeric film, rather than printed. In this case, the density of the etching or embossing should be lower than that of the holographic process so that the information carried by the bar code could be easily separated.

These embodiments have several advantages. The holographic display element can be mass produced and stamped onto a credit card, or on some other object, such as a product container, at relatively low cost. The bar code symbol can be added easily, and can include individual information specific to each card or product. A conventional flying spot scanner can be used to read the bar code symbol without interference from the holographic process, and the bar code symbol does not interfere with the holographic display element.

Figure 4:
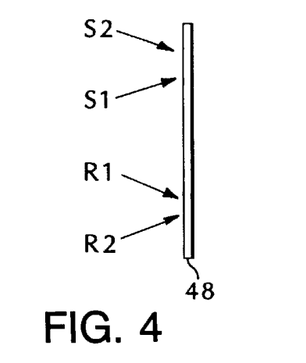
FIG. 4 is a pictorial view of two reference beams and two signal beams.

Referring to FIG. 4, a bar code is holographically recorded on the holographic display along with another object. Two references, R1 and R2, and two corresponding signals, S1 and S2, are represented in the recording stage of forming a hologram 48. To holographically record S1, reference bean R1 is directed at holographic material of hologram 48. When reconstructed, R1 is again directed at the hologram and the image S1 is reconstructed. Two objects, corresponding to S1 and S2, can both be holographically recorded separately or at the same time. Either S1 or S2 can be reconstructed, depending on which reference, R1 or R2, is directed at the hologram. Thus S2 can represent some image, such as an eagle, and S1 a bar code symbol, or vice versa.

The bar code symbol can be recorded like another rainbow hologram, i.e. near the surface and visible in white light, or embossed on the polymeric film. Alternatively, the bar code could be recorded so that it is only detectable when a particular reference beam is directed toward the display, while another image on the display is recorded to be visible in white light. This approach, however, would require different recording techniques and may make the hologram more difficult to manufacture or replicate.

Figure 4A:
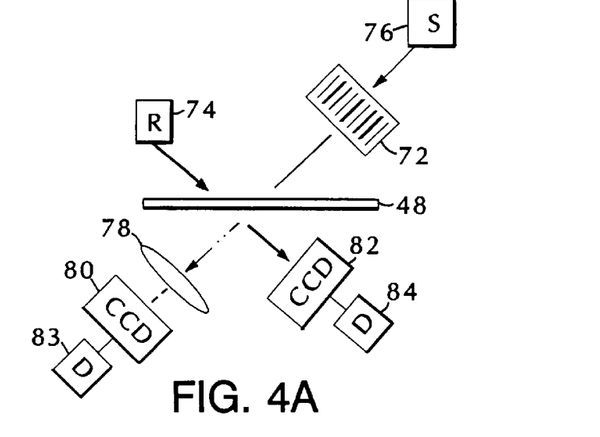
FIG. 4A is a schematic of an apparatus to reconstruct a bar code holographically recorded.

Referring to FIG. 4A, hologram 48 includes a holographic bar code made from reference source 74 and signal source 76 illuminating at bar code 72. To reconstruct, a reference beam from reference source 74 is directed at the hologram and the reconstructed beam is received by a detection apparatus at 80 or 82 if the substrate is transparent. If a CCD camera is used at detection position 80, preceded by relay lens 78, a virtual image can be detected. The virtual image appears as if it were at the previous location of bar code 72. If a real image is desired, it can be observed by a CCD camera at detection position 82. The detection apparatus, whether receiving a real or virtual image, also includes appropriate circuitry 83 or 84 for electro-optically converting the information received at the CCD camera to a series of electrical signals which are decoded and converted to characters.

Figure 5:
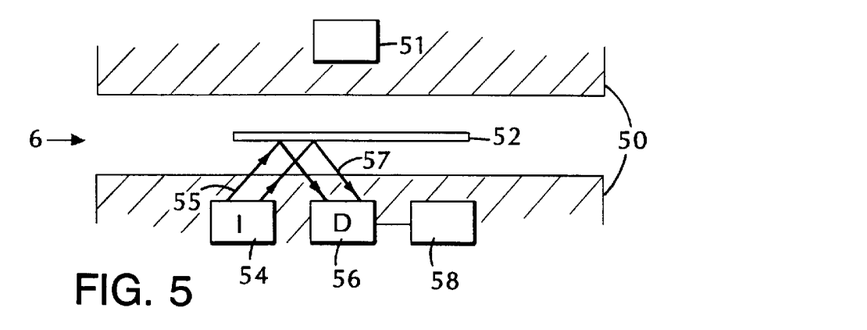
FIG. 5 is an optical reader within a magnetic swiper channel.

Frequently, identification cards, such as credit cards, have a magnetic information strip which is read by being swiped through a channel that includes a magnetic reading apparatus. Referring to FIG. 5, an optical reader is positioned within a magnetic swiper channel with magnetic reading apparatus represented generally at 51. Card 52 is shown between two sides of swiper 50. An illumination source 54 directs a beam or series of beams 55 at a holographic record in the form of a reflective strip (not shown) alongside the strip or possibly superimposed over the strip. The reflected beams 57 are received by CCD array detector 56, and information is converted to electrical signals by circuitry 58. Other optical elements, such as lenses (not shown), could also be included.

Figure 6:
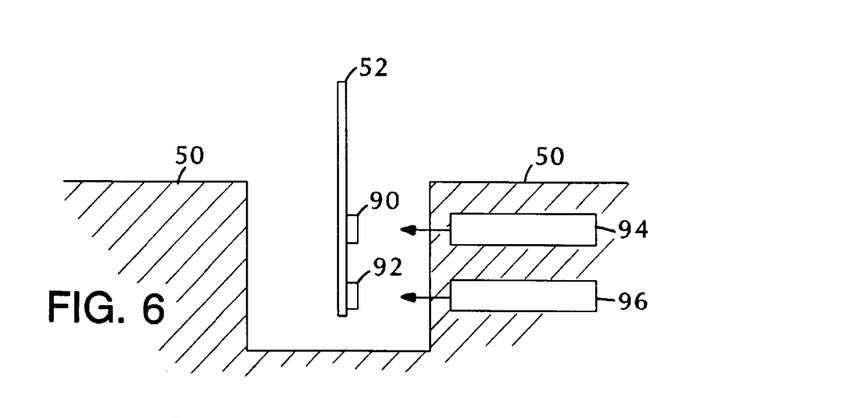
FIG. 6 is a pictorial view of a card in a swiper channel with both magnetic and optical readers, taken through plane 6 of FIG. 5.

A side view of the apparatus of FIG. 5 is shown in FIG. 6 (not drawn to scale), which shows card 52 in the swiper channel with side walls 50. Card 52 has optically readable symbol 90 and magnetic stripe 92. Within the side 50 is an optical detector 94 and magnetic information detector 96. As this figure indicates, both sets of information can be positioned on the card with a compatible reading apparatus for reading both optically and magnetically encoded data. The readers could also be in different walls, so that the optically readable information can be on one side of the card, and magnetic on the other since many credit cards have holographic displays and magnetic stripes on reverse sides of the card. Alternatively, the optical reader could be mounted on top of the swiper thus increasing the height of sidewalls 50. This system could be used with a non-holographic bar code symbol or with a holographically produced bar code symbol used to provide added information or to authenticate the display.

Figure 7:
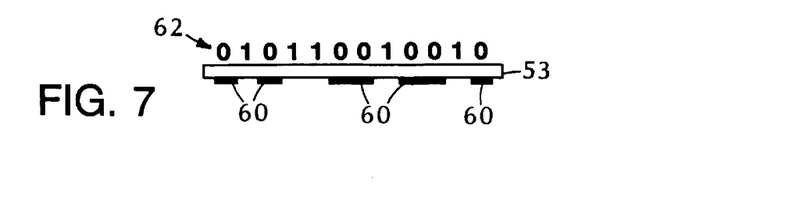
FIG. 7 is a pictorial representation of an identification card with gratings.

FIG. 7 shows a side view of a credit card 53 with gratings 60 (not drawn to scale). Using a similar apparatus as that shown in FIG. 5, these gratings will produce reflected bursts of light which can be read in a manner similar to a bar-type code, i.e. a sequence of zeros and ones corresponding to dark and light as represented at 62. If gratings are used, a motorized swiper can be used to direct the card at a constant rate, or a separate parallel set of equally spaced gratings for synchronization purposes can be added which also produce bursts. Either option would improve the reading since the location and length of each burst is important.

Figure 8:
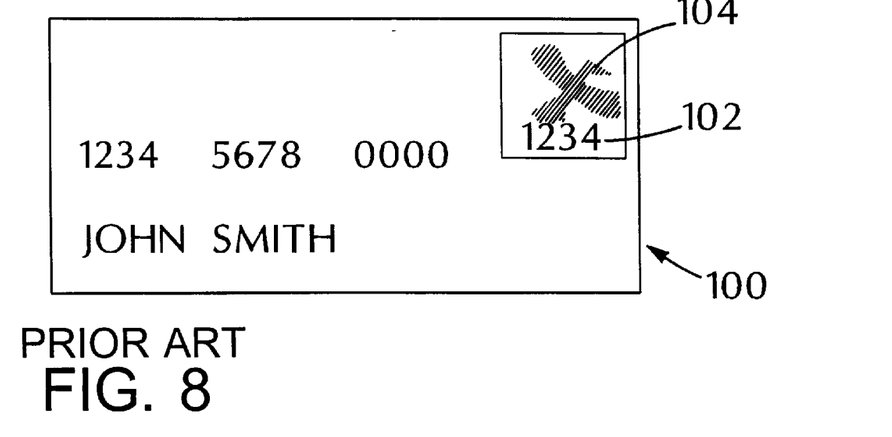
FIG. 8 is a pictorial view of a prior art record carrier (e.g., a credit card).

FIG. 8 shows a prior art record carrier 100 (e.g., a credit card) in which human-readable indicia 102 (e.g., card numbers) overlaps a reflective surface hologram 104 in which a graphic image is recorded.

Figure 9:
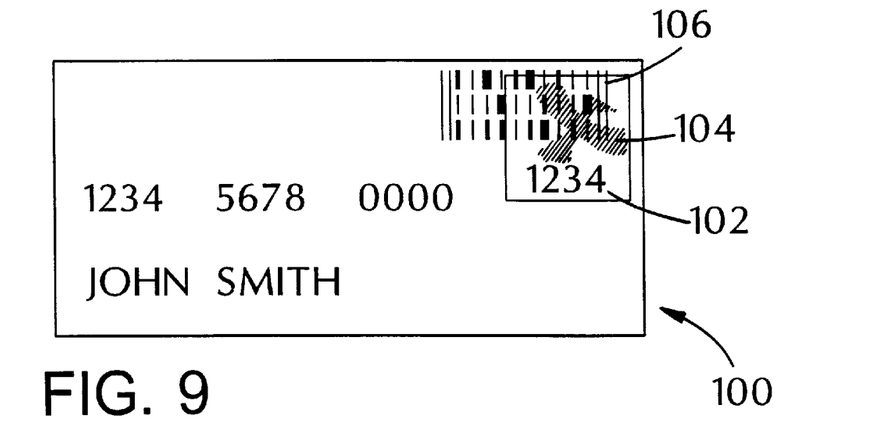
FIG. 9 is a pictorial view of a record carrier (e.g., a credit card) according to one embodiment of the invention, including a hologram with machine-readable indicia overlying the hologram.
Figure 10:
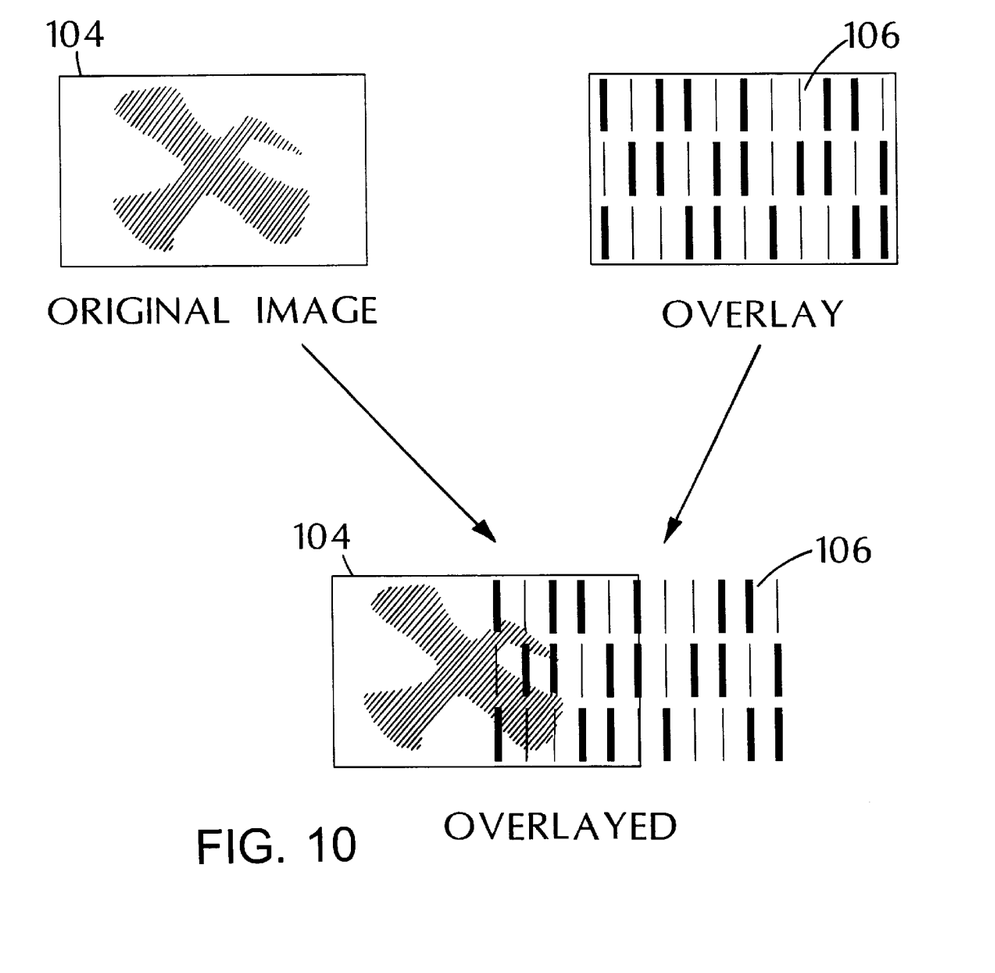
FIG. 10 is a more detailed diagrammatic view illustrating the merger of the hologram and machine-readable indicia of the record carrier of FIG. 9. carrier.
Figure 11:
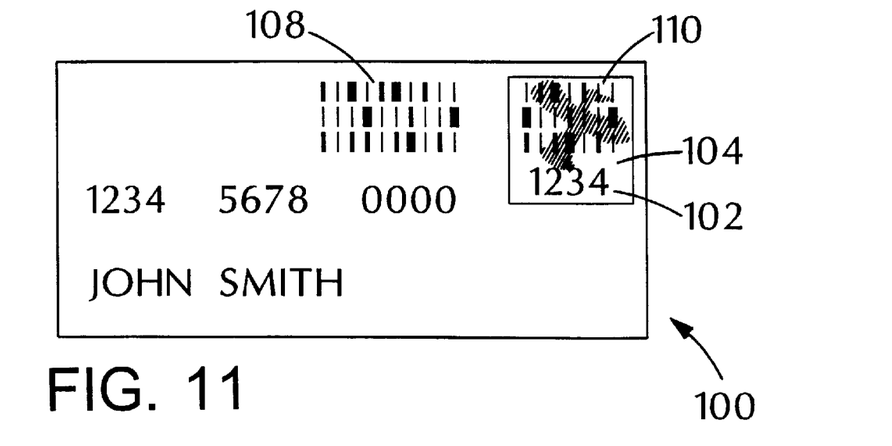
FIG. 11 is a pictorial view of a record carrier (e.g., a credit card) according to one embodiment of the invention, including two distinct and separate patterns of machine-readable indicia, one overlying the hologram and the other separate therefrom.

FIGS. 9 and 10 show embodiments of the invention in which a machine-readable indicia 106 (e.g., a two-dimensional bar code) partially overlays a reflective surface hologram 104. Two-dimensional bar codes are well known (see, e.g., U.S. Pat. Nos. 4,794,239 and 5,235,167, hereby incorporated by reference). The bar code can be applied to the surface of the record carrier by conventional printing techniques to provide regions of different reflectivity. That portion of the bar code on the hologram can be applied by conventional printing techniques (either on the top surface of the hologram or, if the hologram is transparent, on the surface of the record carrier beneath the hologram). Alternatively, the portion of the bar code on the hologram can be formed by variations in reflectivity in the surface of the hologram (e.g., by variation in the gratings that form the hologram). FIG. 11 shows a further embodiment in which two separate machine-readable indicia 108, 110, e.g., two two-dimensional bar codes, are recorded on the record carrier 100. One indicia 108 is printed on the surface of the record carrier; the other indicia 110 is formed on or in the hologram 104. The two machine-readable indicia are related, so that both must be present for a valid decode result to occur. E.g., one indicia could contain information for deencrypting the other indicia. Or both indicia could be separately encrypted, and only readable using deencryption techniques built into the machine reading the record carrier. The deencrypted information read from the two bar codes could be related so that a valid decode can only occur if a predetermined relationship exists between the bar codes.

The machine-readable indicia on the hologram can be configured to corrupt the graphic image of the hologram, and the other indicia applied directly to the record carrier in an area outside the hologram can be configured to supply information representing or corresponding to the corrupted image. Thus, adulteration of either the hologram or either of the machine-readable indicia can be detected by comparing the corrupted graphic image to information stored in the other indicia about the corrupted graphic image.

As with other embodiments, the machine-readable indicia read from the hologram can be printed on the surface of or beneath the hologram, or applied as reflectivity differences on the surface of the hologram (e.g., from differences in the gratings forming the hologram), or stored as a holographic image in the hologram.

Turning again to FIGS. 9 and 10, the two-dimensional bar code structure can be encrypted, wholly or partially, using well known encryption techniques in which, for example, an encryption key is necessary for de-encryption. With such encryption, it becomes essential that the portions of the bar code structure overlying (or underlying) the hologram be precisely aligned with the portions not overlying the hologram, as small misalignment will prevent successful de-encrytion.

Other embodiments are within the claims. For example, the hologram can be a transmission type in which light is transmitted through the hologram to reconstruct stored images. In those embodiments, one or a plurality of patterns of machine-readable indicia can be stored in the hologram, as disclosed in U.S. application Ser. No. 08/212,513, filed on Mar. 11, 1994.

We claim:

1. A record carrier of the type containing machine-readable representations of data, the record carrier comprising:

a substrate on at least one surface of which first machine-readable indicia are applied, the first machine-readable indicia containing first information;

a hologram disposed on said one surface of the substrate, said hologram containing machine-readable data, the machine-readable data containing second information;

said first information and said second information being related to one another, the relationship enabling a user to verify the authenticity of the record carrier by processing the first and second information, wherein the processing includes de-encryption that is dependent on the relationship between of both the first machine-readable indicia and the machine-readable data of hologram.

2. The record carrier of claim 1 wherein the hologram is a reflective surface hologram.

3. The record carrier of claim 2 wherein the machine-readable data contained in the hologram is represented by second machine-readable indicia on the hologram.

4. The record carrier of claim 3 wherein the first and second machine-readable indicia are separate indicia.

5. The record carrier of claim 3 wherein the first and second machine-readable indicia are segments of a third indicia.

6. The record carrier of claim 5 wherein the third indicia is a two-dimensional bar code symbol, a portion of which is applied to the substrate and another portion of which is applied over the reflective surface hologram.

7. The record carrier of claim 3, 4, or 5 wherein the reflective surface hologram includes a graphic image a portion of which overlaps with the second machine-readable indicia.

8. The record carrier of claim 2 wherein the reflective surface hologram includes a graphic image.

9. A record carrier of the type containing machine readable representations of data, the record carrier comprising:
   a substrate on at least one surface of which first machine-readable indicia are applied, the first machine readable indicia containing first information; and
   a reflective surface hologram disposed on said one surface of the substrate, said hologram containing machine-readable data, the machine-readable data containing second information and being represented by second machine-readable indicia on the hologram, the hologram including a graphic image a portion of which overlaps with the second machine-readable indicia;
   said first information and said second information being related to one another, the relationship enabling a user to verify the authenticity of the record carrier by processing the first and second information;
   wherein a portion of the graphic image is corrupted by the overlap of the second machine-readable indicia and information corresponding to the corruption of the graphic image is stored in the first machine-readable indicia, wherein the carrier can be authenticated by making a comparison between the corruption of the graphic image and information stored in the first machine-readable indicia.

10. A record carrier of the type containing machine-readable representations of data, the record carrier comprising:
   a substrate;
   a graphic image disposed on one portion of the substrate;
   a first machine-readable pattern of indicia disposed relative to a portion of said graphic image so as to produce a corrupted image;
   a second machine-readable pattern of indicia disposed on said substrate and spaced from the corrupted image and containing information corresponding to the corrupted image, so that an adulteration of the record carrier is detectable by comparing the corrupted image to the information corresponding to the corrupted image.

11. The record carrier of claim 10 wherein the first machine-readable pattern of indicia at least in part overlaps with a portion of the graphic image.

12. The record carrier of claim 10 wherein the first machine-readable pattern of indicia is at least in part disposed over a portion of the graphic image.

13. A record carrier of the type containing machine-readable representations of data, the record carrier comprising:
   a substrate;
   a graphic image that is a hologram disposed on one portion of the substrate;
   a first machine-readable pattern of indicia disposed relative to a portion of said graphic image so as to produce a corrupted image;
   a second machine-readable pattern of indicia disposed on said substrate and spaced from the corrupted image and containing information corresponding to the corrupted image.

14. The record carrier of claim 13 wherein the hologram is a reflective surface hologram.

15. An encoding method for use in issuing record carriers containing personal identification data, the method comprising:
   entering the personal identification data;
   encrypting at least some of the data using an encryption algorithm based upon an encryption key;
   representing the encrypted data in the form of a two-dimensional bar code structure, the bar code structure including a plurality of ordered, adjacent rows of codewords of bar-coded information, each of said codewords representing at least one information-bearing character; and
   transferring an image of the two-dimensional bar code structure onto a carrier so that it overlaps in part with a hologram disposed on said carrier such that the overlapping part of the image has at least a partial alignment with the non-overlapping part of the image to allow de encryption of the encrypted data.

16. An encoding apparatus for use in issuing record carriers containing personal identification data, the apparatus comprising:
   means for entering the personal identification data;
   means for encrypting at least some of the data using an encryption algorithm based upon an encryption key;
   means for representing the encrypted data in the form of a two-dimensional bar code structure, the bar code structure including a plurality of ordered, adjacent rows of codewords of bar-coded information, each of said codewords representing at least one information-bearing character; and
   means for transferring an image of the two-dimensional bar code structure onto a carrier so that it overlaps in part with a hologram disposed on said carrier such that the overlapping part of the image has at least a partial alignment with the non-overlapping part of the image to allow de encryption of the encrypted data.

17. The subject matter of claim 15 or 16 wherein the hologram is a reflective surface hologram.

18. A record carrier of the type containing machine readable representations of data, the record carrier comprising:
   a substrate on at least one surface of which first machine-readable indicia are applied, the first machine-readable indicia containing first information; and
   a reflective surface hologram disposed on said one surface of the substrate, said hologram containing machine-readable data, the machine-readable data containing second information and being represented by second machine-readable indicia on the hologram, the first and second machine-readable indicia being separate indicia, the hologram including a graphic image a portion of which overlaps with the second machine-readable indicia;

said first information and said second information being related to one another, the relationship enabling a user to verify the authenticity of the record carrier by processing the first and second information;

wherein a portion of the graphic image is corrupted by the overlap of the second machine-readable indicia and information corresponding to the corruption of the graphic image is stored in the first machine-readable indicia, wherein the carrier can be authenticated by making a comparison between the corruption of the graphic image and information stored in the first machine-readable indicia.

19. A record carrier of the type containing machine readable representations of data, the record carrier comprising:

a substrate on at least one surface of which first machine-readable indicia are applied, the first machine-readable indicia containing first information; and a reflective surface hologram disposed on said one surface of the substrate, said hologram containing machine-readable data, the machine-readable data containing second information and being represented by second machine-readable indicia on the hologram, the first and second machine-readable indicia being segments of a third indicia, the hologram including a graphic image a portion of which overlaps with the second machine-readable indicia;

said first information and said second information being related to one another, the relationship enabling a user to verify the authenticity of the record carrier by processing the first and second information;

wherein a portion of the graphic image is corrupted by the overlap of the second machine-readable indicia and information corresponding to the corruption of the graphic image is stored in the first machine-readable indicia, wherein the carrier can be authenticated by making a comparison between the corruption of the graphic image and information stored in the first machine-readable indicia.

20. A record carrier of the type containing machine-readable representations of data, the record carrier comprising:

a substrate;

a graphic image that is a hologram disposed on one portion of the substrate;

a first machine-readable pattern of indicia at least in part overlapping with a portion of the graphic image so as to produce a corrupted image;

a second machine-readable pattern of indicia disposed on said substrate and spaced from the corrupted image and containing information corresponding to the corrupted image.

21. A record carrier of the type containing machine readable representations of data, the record carrier comprising:

a substrate;

a graphic image that is a hologram disposed on one portion of the substrate;

a first machine-readable pattern of indicia at least in part disposed over a portion of the graphic image so as to produce a corrupted image;

a second machine-readable pattern of indicia disposed on said substrate and spaced from the corrupted image and containing information corresponding to the corrupted image.

22. The record carrier of claim 20 or 21 wherein the hologram is a reflective surface hologram.

* * * * *

UNITED STATES PATENT AND TRADEMARK OFFICE
CERTIFICATE OF CORRECTION

PATENT NO.     : 5,900,954
DATED          : MAY 4, 1999
INVENTOR(S)    : JOSEPH KATZ ET AL.

It is certified that error appears in the above-identified patent and that said Letters Patent is hereby corrected as shown below:

Column 3, line 14, change the first occurrence of "the" to --The--.

Column 3, line 54, after "FIG. 9." delete "carrier."

Column 6, line 45, change "de-encrytion" to --de-encryption--.

Column 7, line 2, delete "of".

Signed and Sealed this

Seventeenth Day of April, 2001

Attest:

NICHOLAS P. GODICI

Attesting Officer

Acting Director of the United States Patent and Trademark Office